UNITED STATES PATENT OFFICE.

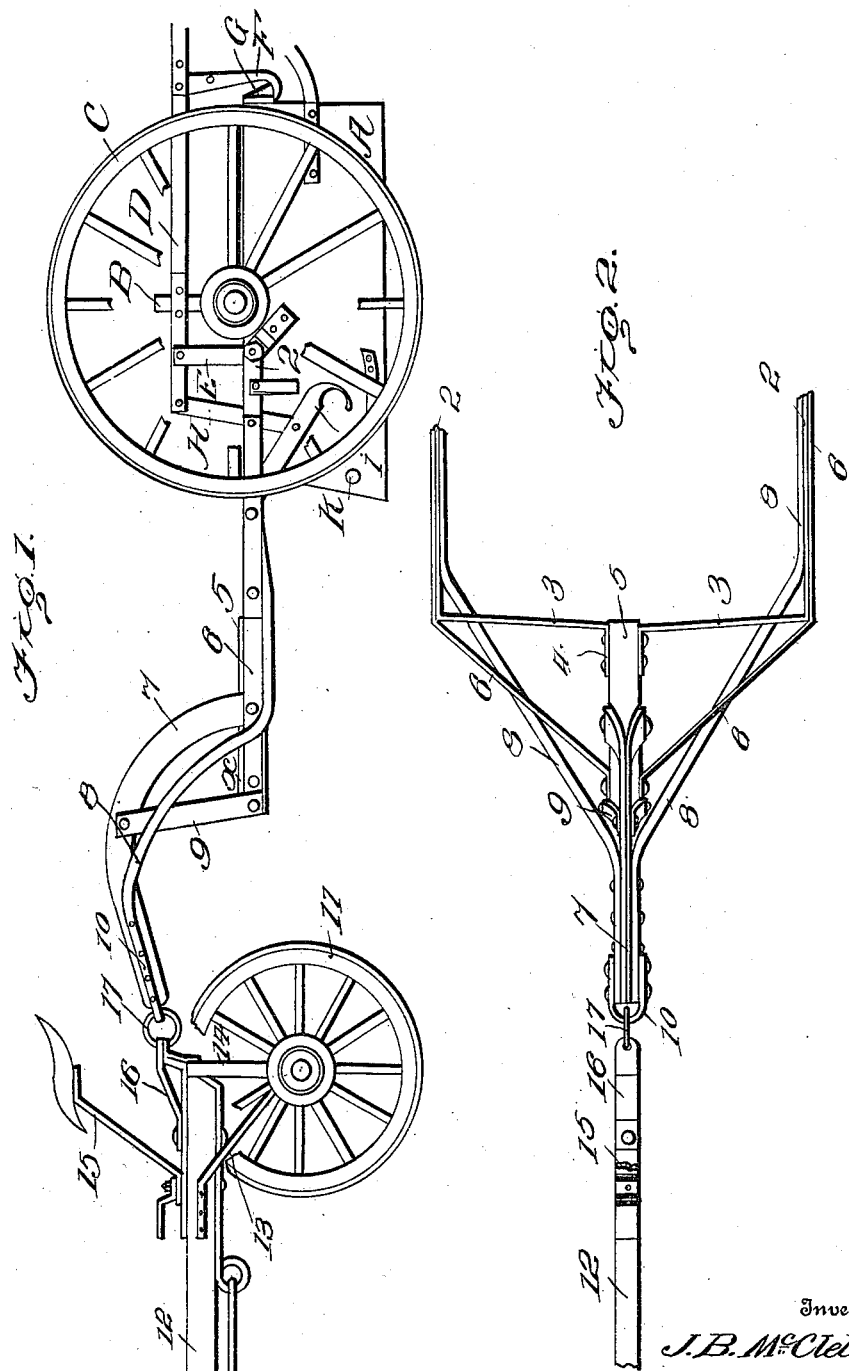

JAMES B. McCLELLAN, OF DENISON, IOWA, ASSIGNOR OF ONE-THIRD TO EUGENE GULICK, OF DENISON, IOWA.

WHEEL-SCRAPER.

975,974.

Specification of Letters Patent. Patented Nov. 15, 1910.

Application filed May 29, 1909. Serial No. 499,257.

*To all whom it may concern:*

Be it known that I, JAMES B. MCCLELLAN, a citizen of the United States, residing at Denison, in the county of Crawford and State of Iowa, have invented a new and useful Device to be Placed on a Wheel-Scraper, of which the following is a specification.

My invention relates to wheel scrapers, and particularly to that type of scraper in which a swing scoop is used mounted on a wheel frame and adapted to be tripped in order to overturn the scoop and dump the contents thereof.

This type of scraper is open to the following objections, namely, that the side motion of the scraper and the swing of the tongue are communicated to the neck and sides of the draft animal, and hence some power has to be exerted by the draft animal not only to fill the scraper and to move the same, but to resist the side motion and swing of the tongue; further, the weight of the scraper, the earth carried thereby, and the weight of the tongue bear upon the draft animal unnecessarily and without any compensating advantage; further, this construction of these scrapers is such that in drawing a loaded scraper from a cut or furrow, the scraper must be twisted as well as pulled out of the furrow. In other words, no direct sidewise draft can come upon the scraper, it has to be partially rotated as well as pulled. This causes a great strain on the horse. Again, when the scraper is going down the incline of the dump, after the scoop has been tripped and the load dumped, as the driver turns his team to the right or left, the weight of the scraper will come entirely against the horse and will be exerted against the side and neck of the horse. Furthermore, in this type of scraper, no provision can be made for the driver's seat.

My invention obviates these objections by providing a light forward truck to which the draft animal is hitched, the wheeled frame supporting the scraper being shackled or otherwise freely connected at its forward end upon the forward truck. The forward end of the scraper-supporting frame is provided with an arch under which the wheels of the truck may turn when the draft animal is turned at an angle to the right or left. By this means, the draft animal may be turned at an angle without bearing the weight of the scraper, and may thereby exert its full strength in drawing the scraper. By the use of my device, a light team may be used for operating the scraper where heretofore a heavy team has been required. This has been necessary not so much because of the strength required for pulling the scraper, as for the necessity of supporting the scraper against sidewise movement in turning, it being difficult for a light team to twist the scraper out of the furrow or cut.

For a full understanding of the invention and the merits thereof, and to acquire a knowledge of the details of construction, reference is to be had to the following description and accompanying drawing, in which:

Figure 1 is a side elevation of a scraper arranged in accordance with my invention; and, Fig. 2 is a fragmentary plan view of the forward end of the scraper-supporting frame and the rear end of the fore-truck, the driver's seat being removed.

Corresponding and like parts are referred to in the following description and indicated in all the views of the drawing by the same reference characters.

Referring to the figures, A designates a scraper, bucket or scoop of any desired character which is supported upon the cranked axle B, the ends of this cranked axle being carried by the wheels C. The scoop is connected to the cranked axle B by means of levers D which are fastened to the cranked axle, these levers being connected at their forward ends to the scoop A by the links E. The rear end of the levers D are connected and formed with the downwardly extending hook F which engages over a depending lug G on the rear end of the scoop. The forward end of the levers D is provided with a link H which is connected to a pivoted locking member *i*, the lower end of which is hooked and adapted to engage with the lug K. It is to be understood that I have shown and described above an ordinary form of pivoted scoop scraper, but I do not wish to limit myself to any particular construction of this part, the detailed construction of the scraper and its mounting upon the rear wheels being no part of my invention. In view of this fact, it is unnecessary to go into detailed description of the connections and mounting of this scoop. The scoop is connected on each side to draft bars 2 which extend forward to a position in front of the rear wheels and are then turned inwardly at right angles, as at 3. The terminal ends of the bars 3 are then again angled, as at 4, and bolted to a block 5. The forward end of the block 5 has applied to it, on opposite sides, the braces 6 which are bolted to the block 5, at their forward ends are inclined outwardly and rearwardly and fit against the outer faces of the draft bars 2. Mounted about the middle of the block 5 and extending upward and forward in an arch are the arch bars 7 which are riveted or bolted to each other. The forward end of the arch thus formed is bolted or riveted to the opposed braces 8 which extend rearward and outward and at their rearward terminations are bolted or otherwise attached to the draft bars 2 and the braces 6. It will thus be seen that the draft bars, the braces 6, the block 5 and the arch are all held in solid engagement with each other. The arch is further supported and held in rigid engagement with the draft bars by means of the upwardly extending opposed braces 9 which are attached at their lower ends to the forward extremity of the block 5 and at their upper ends on each side of the arch 7, as shown clearly in Fig. 1. The extreme forward end of the arch 7 is provided with the clevis 10 which is riveted thereto.

The forward truck has the wheel or opposed wheels 11 upon which is supported the tongue 12, the rear end of the tongue being mounted on the wheels by means of the standards and braces 13 and 14. Upon this tongue is mounted the seat-supporting post 15, and attached to the rear end of the tongue are the angle bars 16 which form together an eye or other support in which the ring or shackle 17 is mounted. This ring or shackle 17 passes through the clevis 10. It will be seen that the ring 17 is freely rotatable within the perforations in the angle bar 16 and also in the clevis 10 so that the fore-truck is freely shackled to the rear scoop-supporting truck. It will also be seen that the arch 7 permits the wheels of the fore-truck to pass beneath the supporting frame, and thus permits the tongue 12 to be turned at right angles to the reach formed by the bars 5 and 7.

It is in the provision of a fore-truck upon which the weight of the forward end of the scraper is supported, and in the free shackling of this fore-truck to the scraper-supporting frame that my invention especially consists. All weight is taken off the necks or bodies of the draft animals; the sidewise movement of the scraper is not communicated to the draft animals, and when turning out of a furrow, the animals can be turned at right angles and exert the full strength of their pull without any side strains being exerted against them. The tongue 12 is perfectly free and follows completely the motions of the draft animals, and is not oscillated or swung by the twisting or turning of the scoop and the supporting frame therefor. Furthermore, this forward truck provides a seat for the driver without the weight of the driver coming to any great degree upon the draft animals, practically the entire weight of the driver being supported upon the truck. The entire weight coming upon the horses is the weight of this light forward truck. It is to be understood that while I have shown a definite and concrete form of my invention, I do not wish to be limited to the details illustrated.

Having thus described the invention, what I claim is:—

1. The combination with a rear wheeled frame and a pivoted scraper supported thereon, the forward end of said rear frame being upwardly arched, of a forward truck, a rearwardly projecting vertically disposed ring carried in eyes on said truck, and a horizontally disposed clevis on the forward end of the rear frame engaging said ring whereby the rear frame has free lateral and vertical movement relative to the forward truck.

2. The combination with a rear wheeled frame, and a pivoted scraper carried thereon, the forward end of said frame being upwardly arched, of a forward truck, an upwardly projecting member carried on said truck and extending above the wheels thereof, a rearwardly projecting vertically disposed ring carried in eyes on said truck, and a horizontally disposed clevis on the forward end of the rear frame engaging said ring whereby the rear frame has free lateral and vertical movement relative to the forward truck.

JAMES B. McCLELLAN.

Witnesses:
  EUGENE GULICK,
  P. J. BRANNON.